Oct. 4, 1966 L. B. PALMER 3,276,904
PROCESS OF MAKING A DECORATIVE SURFACE COVERING
Filed Aug. 8, 1961
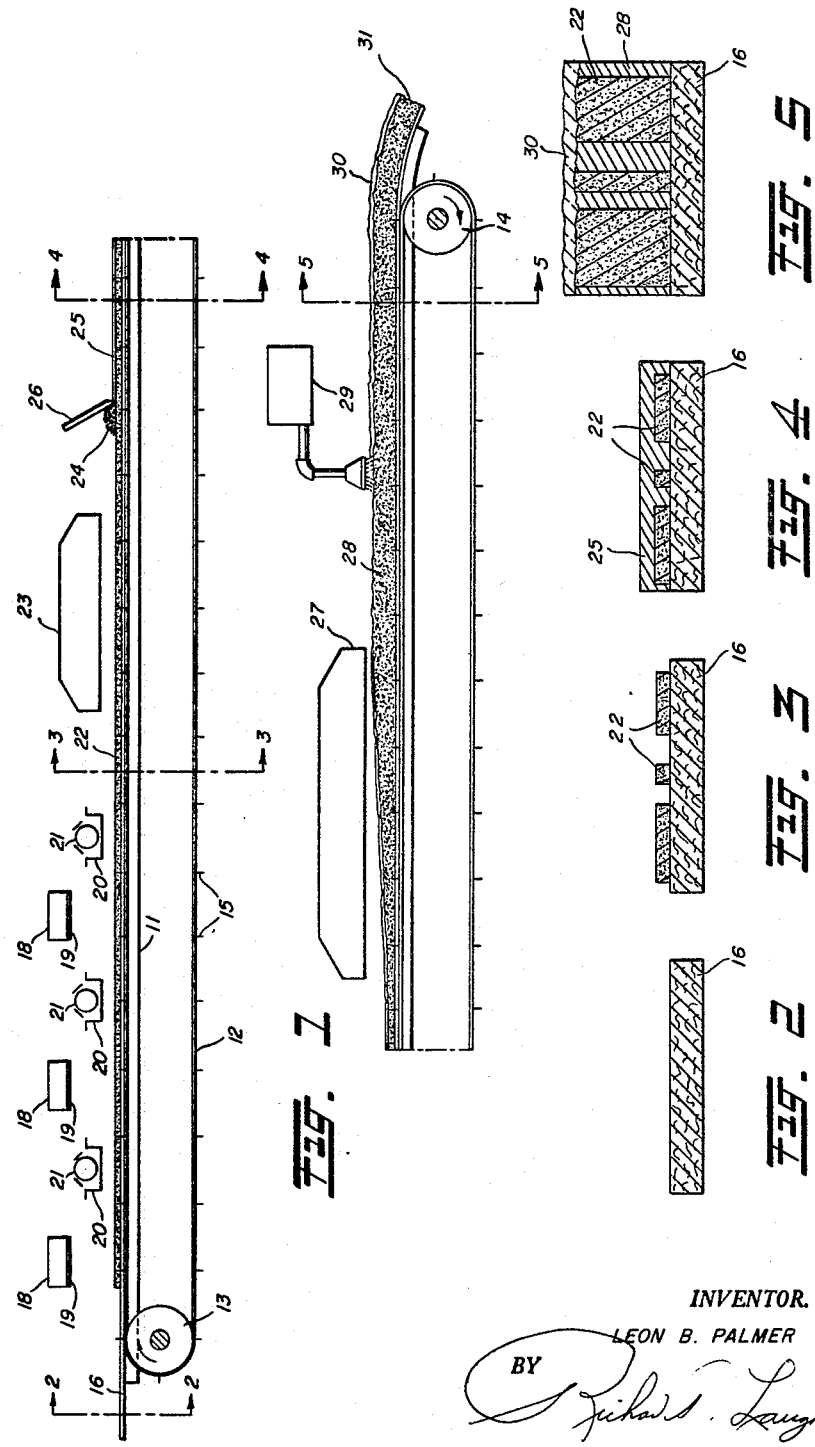
INVENTOR.
LEON B. PALMER
BY
ATTORNEY

United States Patent Office 3,276,904
Patented Oct. 4, 1966

3,276,904
PROCESS OF MAKING A DECORATIVE
SURFACE COVERING
Leon B. Palmer, Little Falls, N.J., assignor to Congoleum-Nairn Inc., Kearny, N.J., a corporation of New York
Filed Aug. 8, 1961, Ser. No. 130,029
7 Claims. (Cl. 117—15)

This invention relates to decorative surface coverings for floors, walls, articles of furniture and the like and particularly to such surface coverings having an inlaid decoration and to a method of producing such surface coverings.

Decorative sheet materials having a printed decorative and wear resisting composition layer bonded to a backing are well known and find wide application as coverings for floors, walls, articles of furniture and the like. One widely used type of printed surface covering is called printed felt base. This surface covering has a relatively thick wear layer on a felt sheet impregnated with a waterproofing agent. The wear layer is formed by printing different colored compositions in a design to completely cover the base. The most common printing compositions are oleoresinous paints although vinyl resin compositions have also been utilized. In order to produce such a product, it is necessary to print all of various colored paints including the background color. It is difficult, utilizing such a procedure, to produce a sharp demarcation line between the various colored paints since it is essential for the various compositions to flow together to avoid leaving any void or uneven spots in the wear layer. In addition, it is necessary for the paints to be self-leveling in order to have a smooth surface product. In this type of printed surface covering, the decorative layer is directly subjected to abrasion and wear. The useful life of the product, therefore, is controlled by the thickness of the paints which make up the design. This product is conventionally produced by utilizing a flat bed print machine whereby wooden printing blocks apply the various paints to the base.

The second type of printed surface covering available has a base such as a felt sheet impregnated with a waterproofing agent or a resinous composition sheet. The design is printed on the surface of the base by means of the rotogravure printing technique utilizing printing inks and the wear layer is a transparent or translucent composition coating or sheet which completely covers the printed base allowing the design to be seen through the wear layer. As an alternative, the design is printed on the underside of the wear layer which is then laminated to the base. The life of the product is determined by the thickness of the transparent wear layer. Once the transparent wear layer has been worn away, the design, because of its thinness, is quickly removed. The printed products have the advantage over the conventional inlaid linoleum and molded vinyl surface coverings in that the design possibilities are only limited in what can be printed.

Compositions used for the wear resistant layer of floor coverings and the like are pigmented to any of a variety of hues utilizing organic or inorganic pigments. Inorganic pigments have found particularly widespread use since they are much less affected by the components of the composition. In selecting a particular pigment, it is essential that it have good light, heat and chemical stability. In addition, it should have freedom from crocking (raising or floating of the pigments to the surface), migration (diffusing of the pigments from one film to another), and bleeding (solubility of the pigment in solvents, plasticizer or other chemical agents). In selecting a particular pigment, therefore, it is necessary to make all of these determinations with the particular composition to be utilized.

An object of the invention is to produce a printed decorative surface covering having the printed decoration extending for a substantial distance through the wear layer of the product. Another object is to provide a simple and economical process for producing such a surface covering without the need for a large amount of mixing equipment. A further object of the invention is to produce a surface covering having an opaque wear layer with a printed design extending for a substantial distance through the wear layer. Other objects and the advantages of the invention will appear hereinafter.

The present invention is based on the discovery that the heretofore undesirable pigments which exhibit bleeding characteristics can be utilized in a novel way whereby their bleeding is advantageous. In accordance with the invention, a printing composition containing a bleeding pigment is applied to a base in the form of a design and a resinous wear layer is then applied to the surface of the printed base. The composition sheet is then heated for a limited period to cause the pigment to bleed through the wear layer. The pigment migrates upward through the resinous layer, extending to the design to the surface of the wear layer and reproducing the design throughout the thickness of the layer in duplication of the printed design. The process of the invention lends itself readily to high-speed rotogravure techniques, flat bed printing processes and similar printing procedures. The process affords a simple and convenient method for producing a through printed decorated sheet using a large range of resinous compositions. Utilizing bleeding pigments, it is possible to produce printed decorations in linoleum, calender and molded vinyl and similar products. In addition, it offers a method for producing products with irregular surfaces having a printed decoration. The invention has its greatest utility with opaque wear layers such as linoleum and colored vinyl sheets in making possible the production of designs heretofore unobtainable in such products. The reason for the unusually good fidelity in the reproduction of the design after controlled heating of the bleeding pigments is not known since it would be expected that the pigments would bleed in all directions which would make good reproduction through the wear layer impossible.

In order to accomplish the ends of the invention, it is necessary that the resinous layer deposited over the pigment design contain a plasticizer which is a solvent for the pigments utilized. The migratory phenomenon exhibited by the pigment can be related to the solubility of the pigment in such plasticizers. If a pigment is soluble in a particular solvent, it will dissolve in that solvent when it comes into contact with a film wherein that solvent is contained. Plasticizers are types of high boiling organic solvents and, consequently, will dissolve such soluble pigments. In general, the solubility of the pigments in organic solvents will parallel the solubility in plasticizers. Although the pigment-solubilizing agent is generally contained in the layer overlying the printed design, some degree of solution of the pigment will occur if a plasticizer is incorporated in the pigment vehicle providing the resinous layer will absorb the plasticizer.

One method for carrying out the invention will be described with reference to the drawings utilizing a conventional block printing machine for applying the design to the base.

FIG. 1 is a schematic representation of the apparatus used in one method for producing a decorative surface covering in accordance with the present invention;

FIG. 2 is an enlarged cross sectional view of the backing taken along line 2—2 of FIG. 1;

FIG. 3 is an enlarged cross sectional view of the backing with a design, greatly enlarged for clarity, applied thereon taken along line 3—3 of FIG. 1;

FIG. 4 is an enlarged cross sectional view of the backing with the design and foamable composition applied thereon taken along line 4—4 of FIG. 1; and FIG. 5 is an enlarged cross sectional view of the final product.

With reference to FIG. 1, a decorative design is applied by block printing with a standard block printing machine. The block printing machine shown consists of a bed 11 which extends its entire length and width. At each of the opposite sides of the bed is an endless belt 12 provided with pins 15 which project vertically from the belt at spaced points throughout its length. The belt 12 passes around and is driven by wheels 13, 14. A web of backing material 16 such as a felt sheet is engaged along its periphery by the pins 15 which pierce the felt and advance it along the machine. The block printing machine is provided with a plurality of vertically reciprocal print blocks 18 which are provided with printing surfaces 19 cut in the form of the portion of the design to be printed by each block. Associated with each print block is a paint pot 20 with a roller 21. When the print blocks are at rest at their maximum height, the paint pot with associated roller moves beneath the block thereby transferring a film of printing composition to the printing surface of the block. Through conventional operation of the block printing machine, a film of printing composition 22 is applied to the upper surface of the web of backing material. The operation of the block printing step is conventional although unlike its usual operation it is not necessary to print a design covering the entire surface. In place of the block printing method shown, a rotary method or any other printing method can be used such as a rotogravure printing press. A rotogravure press has the advantage in being a high-speed operation and is particularly suited to use when only a thin application of pigment is necessary.

The sheet can pass through a heating oven generally indicated at 23 to dry the printing composition if necessary. A resinous coating is then applied to completely cover the printed surface. The resinous coating can be completely opaque or it can have transparent or transluscent areas. In the drawing, a foamable plastisol composition is used as the resinous coating and is formed into the layer 25 having controlled thickness by means of a doctor blade 26. The foamable layer is carried by the motion of the endless belt through a hot air oven 27 which serves to decompose the blowing agent contained in the composition and also to fuse the composition thereby producing a decorative fused foamed layer 28. The heating also causes the printed design to bleed through the foamed layer to reproduce the printed design through the thickness of the resinous layer. If desired, the foamed sheet can then be passed to a coating apparatus such as a spray 29 to coat the surface of the foamed layer with a clear top coating 30 to give the product greater soil resistance. This coating can be tinted slightly to intensify one or more of the colors of the printed pigments. The clear top coating may then be air or oven dried. Care must be exercised in heating the product after the desired bleeding of the pigment has been obtained to prevent the design from becoming diffused. The product 31 having a foamed layer with a design extending completely through the foamed layer and having a clear surface coating can then be passed to storage. The product can be used in sheet form or cut into tiles as desired.

As is to be expected, various pigments show different solubilities in plasticizers. Pigments that exhibit migratory characteristics can be found throughout various classes of organic compounds, although attempts to form a comprehensive listing of such pigments is limited by the particular processing conditions and resinous wear layer selected. In addition, only pigments which provide adequate light and heat stability in the resinous wear layer should be generally used.

A convenient testing procedure can be utilized in order to determine the solubility characteristics of a pigment in a particular system. An ink containing the pigment and suitable for application by means of a ruling pen is prepared according to the form in which the pigment is embodied. Dry pigments can be prepared by the following method: 2 grams of dry pigment are placed on a ground glass plate. Dioctyl phthalate is added slowly and blended with the pigment until a smooth paste is obtained with a minimum of concentration of dioctyl phthalate. The pigment paste is then added to a stock vinyl solution containing 30 percent copolymer of vinyl chloride (87%) and vinyl acetate (13%) in methyl ethyl ketone so as to provide a composition having 1 part pigment to 3 parts resin. Methyl ethyl ketone or some other suitable solvent is used to dilute the composition to ink viscosity. The foregoing procedure can also be followed if a pigment plasticizer paste is to be employed. The paste is added to the stock vinyl solution to provide a composition having 1 part pigment to 3 parts resin. An aqueous pigment dispersion can be added to a polyvinyl chloride or a polyvinyl acetate copolymer latex so as to provide a 1 to 3 parts pigment to resin ratio. The resulting mixture can be diluted to ink viscosity with water.

The ink is then applied by a ruling pen in any desired design on a base and heat is applied in order to remove all the solvent or water. A layer of the resinous composition to be employed in conjunction with the pigment being tested is then applied over the dried design. The resinous layer is heated at elevated temperatures for several minutes. The temperature utilized will depend on the composition of the wear layer being tested since the heating should not cause degradation of the composition. Generally, attaining a uniform temperature of about 375° F. throughout the composition is necessary. As a general rule, heating for three minutes at about 400° F. will suffice. When certain resinous wear layer compositions are used such as linoleums which are adversely affected by such heat, it is necessary to heat at lower temperatures for a longer period of time. If the pigment used in the design is suitable for the purposes of this invention, the color and design will extend up through and to the surface of the resinous composition wear layer. If no color is observed either on the surface of the layer or in the thickness of the layer as determined by a cross sectional cut, then the pigment is not suitable for the wear layer even under extended heating periods.

The foregoing procedure for testing pigment migratory tendencies can be varied to confrom to varying characteristics of the pigment or the resinous composition of the layer and to accommodate different processing conditions. In order to obtain maximum fidelity and delineation of design, the amount of pigment in the design should be kept at the minimum needed to transmit the design through the wear layer. If too much pigment is present, undesirable "crocking" will result. Consequently, each pigment should be tested for strength of bleeding tendency in the particularly system in which it is to be used and adjusted accordingly to the minimum level. The test procedure set forth previously will enable the determination of the amount of pigment that can be used to best effect in each system. Depending on varying conditions like plasticizer content of the composition, heat conditions the product must be subjected to during processing, and character of the pigment, the quantity of pigment in the design can range from about 0.50 percent to about 75 percent by weight. Good fidelity of design has been reproduced through a 0.0045 inch vinyl film using as little as 0.5 percent Toluidine Red (Color Index number :69) in the design.

Synthetic organic pigments provide the greatest number of pigments that can be employed in this invention.

Particularly suitable for the purposes of this invention are those pigments comprising the class of water-insoluble azo pigments and the class of permanent dye pigments. The insoluble azo pigments comprise those dye stuffs which possess the characteristic azo group, that is, the divalent —N:N— radical, and which requires no conversion to salts, these pigments being insoluble in the reacting medium directly on formation. The insoluble azo compounds are precipitated by coupling diazotized or tetrazotized amino compounds with a phenolic compound or with an acetoacetanilide or the derivatives thereof. Neither of the coupling reagents, however, contain acidic salt-forming groups. Among the amines that can be used for the production of these colors are toluidines, nitrotoluidines, chlorotoluidines, anisidines, nitroanasidines, nitroanalines, chloronitroanalines, chloronitrotoluidines, naphthylamines, and the like. The most commonly used pigments in this group are listed in Table I. Some of the pigments within this classification, notably several pyrazolone pigments, do not exhibit bleeding characteristics. As a class, however, the azo pigment dyestuffs offer the widest selection of pigments useful in this invention.

Another class of suitable pigments are the permanent basic dye pigments. This group comprises the phosphotungstic, phosphomolybdic and phosphotungstomolybdic acid toners (commonly referred to as the PTA, PMA, and PTMA pigments) of the basic dyestuffs. Complex inorganic acids are formed when a mixture of disodium phosphate and sodium tungstate or molybdate are treated in solution with a strong mineral acid. These acids are reacted with basic dyes, for example, Victoria Blue, to yield the PTA, PMA, and PTMA pigments. Pigments in this class exhibit strong bleeding characteristics in plasticized vinyl systems and several of these pigments are listed in Table I.

Bleeding pigments can be found among various other pigment classes although no general principle can be stated to determine the bleeding ability of a pigment. Some pigments will exhibit bleeding characteristics in specified types of solvents. Dibenzanthrone Violet (Color Index number :1104) is a vat dye that bleeds only in oxygenated and aromatic type plasticizers. Some varieties of the Thioindigoid Maroon (Color Index number :1207) vat dyes also will bleed in ketone and aromatic plasticizers. Pigments of the same classification, on the other hand, can exhibit different solubility properties. Pyrazolone Orange (Benzidine Orange) has good bleeding characteristics whereas Pyrazolone Red shows varying tendencies to bleed depending on the formulation used. There are, therefore, a number of variables that must be considered in choosing a pigment for use with a particular resinous composition. Individual testing with each pigment and each composition must provide the basis for determining the solubility and bleeding characteristics of a pigment in a particular wear layer. The following table lists several pigment classifications and bleeding pigments to be found therein:

The effect of various other factors on pigment bleeding must also be considered. If the resinous wear layer composition is laid as an organosol, there could be present, besides the plasticizer, residual ester and ketone solvents as dispersants and aromatic or aliphatic hydrocarbons as diluents. These reagents can exert considerable influence on the ability of the pigment to move through the resinous film. The selection of a stabilizer for the resin can also effect pigment movement. Many stabilizers basic in nature can replace the precipitating metal from precipitated organic pigments, thereby increasing the solubility of the pigment in the plasticizer. Care should also be exercised in stabilization since when using resins containing chlorine, hydrogen chloride can be liberated from the wear layer and strip the metal from the precipitated pigment, thereby converting the dyestuff to acidic form and rendering it subject to bleeding. Bleeding in the pigmented layer can also be effected by incompatability of the stabilizer with other components of the wear layer. Increased concentration of lubricants or pigments promote bleeding tendencies in a vinyl composition wear layer. Lastly, the properties of the resin itself must be considered in the formulation of a product suitable for the purposes of this invention. Resins differ from each other in viscosity, stability, softening point and plasticizer absorption and compatability. All of these variable factors can be accounted for by simulating similar factors in the test previously given.

As indicated above, controlled heat is necessary to effect controlled bleeding of the pigment. Wear layer thickness will effect the rate of bleeding, the fidelity of design reproduction, and the intensity of color reproduction. It has been found that pigment bleeding occurs readily through a 0.012 inch coating of vinyl plastisol subjected to a temperature of about 400° F. for about two minutes. The preferred range for vinyl resin composition is heating for a period of about ½ to about 4 minutes at a temperature of about 300° F. to about 400° F. When utilizing a conventional linoleum composition, sufficient bleeding is obtained during the conventional curing which is carried out for a period of about two to four weeks at 180° F. The thickness of the coating can range from about 0.001 inch to about 0.050 inch, but a thickness of from about 0.005 inch to about 0.025 inch is preferred. Foam films having a thickness of from about 0.010 inch to about 0.100 inch have been found satisfactory when employed in the present process. The best results for design fidelity were obtained for foam layers having a thickness of from about 0.015 inch to about 0.040 inch.

Suitable backing sheets include those formed of flexible resinous compositions as well as sheets of woven fabric and felted fibers. Any of the thermoplastic or elastomer resinous compositions which can be calendered or pressed to form a flexible sheet can be used to form backing sheets for use in the invention. Typical of the resins which can be compounded with plasticizers and fillers and sheeted to form a flexible sheet are such resins

TABLE I

| Classification | Yellows | Oranges | Reds | Maroons | Greens | Blues | Violets |
|---|---|---|---|---|---|---|---|
| Insoluble AZO Dyestuffs | HANSA (Pr:103-G) [1] (Pr:105-10G) [1] Toluidine Benzidine (Pr:518) [1] | HANSA Permanent O-Nitroaniline Benzidine | Toluidine (CI:69) [2] PARA (CI:44) [2] Chlorinated PARA Naphthol | Toluidine α-Napthyl-amine | | | |
| Basic Dyestuff Pigments (PTA, PMA, PTMA) | Auramine Thioflavin | | Rhodamine Fuchsine | | Malachite | Victoria Peacock | Methyl |
| Anthraquinone and Vat Dyestuffs | | Orange RK | | Alumina lake of Quinzarin Thioindigoid (CI:1207) | | | Dibenzanthrone (CI:1104) |

[1] Prototype, Amer. Assoc. of Textile Colorists & Chemists, vol. 31 (1955).
[2] Color Index Number.

as butadiene-styrene copolymers, polymerized chloroprene, polyvinyl chloride, polyvinyl acetate, vinyl chloride-vinyl acetate copolymers and the like. In some cases, scrap and degraded resinous compositions can be salvaged by forming them into sheets which can be used as backing sheets in producing products in accordance with the invention.

Suitable backing sheets also include woven fabrics formed of such fibers as cotton, wool, asbestos and synthetic fibers. Felted cellulose or mineral fibrous sheets impregnated with a waterproofing and strengthening saturant are particularly useful in accordance with the invention since they are low in cost and yet are flexible and strong. The sources of cellulose can include cotton or other rags, wood pulp, paper boxes, or mixtures thereof in any proportion. Asbestos is the most commonly used mineral fiber. In addition to the fibers, fillers such as wood flour can be used. A slurry of fibrous material in water is formed into a sheet using any of the techniques conventionally employed in the manufacture of paper. For example, sheet formulation can take place on a Fourdrinier or cylinder sheet forming machine. The fibrous sheet so prepared is then dried. In addition to cellulose and mineral fibers, other fibers can be used including synthetic fibers and those of animal origin.

The particular waterproofing and strengthening impregnant chosen must not only be capable of imparting strength and water resistance to the sheet, but must also meet other requirements as to its physical and chemical behavior at the temperatures to which it will be subjected during processing. Some of the compositions applied to the felt in accordance with the invention must be heated to temperatures as high as 300° F. to 400° F. in order to fuse the resin and/or expand the composition to a foam. Thus, the impregnant chosen must be stable at these temperatures. The impregnant should be substantially free of any components which are volatile at these temperatures and it also must not soften to such an extent as to exude from the sheet. In addition, the impregnant should not be subject to appreciable detrimental chemical changes such as oxidation.

Suitable impregnants include vinyl resins, such as polymers of vinyl chloride and vinyl acetate. Particularly suitable are copolymers of vinyl acetate and vinyl chloride or these monomers copolymerized with other monomers copolymerizable therewith. In addition, polymerized acrylic and methacrylic acids and their polymerized derivatives polyethylene, polystyrene, butadiene-styrene copolymer, butadiene-acrylonitrile copolymer, natural rubber, polymerized chloroprene and the like are suitable. Thermosetting resins which under the influence of heat cure by polymerizing and cross-linking with the cellulose can also be used as impregnants. Such resins as phenolic resins, polyesters, oleoresins such as drying oils, and the like, isocyanates and polyurethanes and the like are also useful.

These resins can be incorporated into the felted fibrous sheet by impregnation of the sheet with an emulsion or solution of the resin followed by drying of the sheet to remove the solvent. Alternately, the resin can be added in fine particles to the fiber furnish prior to sheet formation either as solid particles of resin or as an emulsion in water or other emulsifying vehicle. It is usually desirable to coat the surface of the felt with conventional seal coats to prevent bleeding of the pigment and improve adhesion of the coatings to the base.

The particular base sheet selected will effect the bleeding pigments. If the pigment is absorbed or bleeds through the base then the intensity of the color of the pigment will be affected. The bleeding of a pigment into various bases is shown by the following test.

Parallel lines were drawn on various types of bases using Toluidine Red in a carrier formed of a copolymer of vinyl chloride and vinyl acetate. After drying the ink, a 0.012 inch thick coating of a white plastisol of polyvinyl chloride and dioctyl phthalate (100/60 parts) was applied to the printed surface. The coating was then heated at 400° F. for 2½ minutes to cure the coating and cause the pigment to bleed. The product was then cut through across the parallel lines and the cross-sectional cuts examined for extent of pigment bleed upward through the vinyl plastisol film and downward through the base. The results are shown in Table II.

TABLE II

| Base | Base Thickness | Extent of Pigment Bleed after Fusion | |
|---|---|---|---|
| | | Coating | Base |
| Cellulosic Felt | 0.042 | 0.012 | 0.007 |
| Do.[1] | 0.043 | 0.012 | 0.007 |
| Do.[2] | 0.029 | 0.012 | 0.012 |
| Rigid polyvinyl chloride sheet | 0.037 | 0.012 | 0.004 |
| Plasticized polyvinyl chloride sheet | 0.032 | 0.012 | 0.012 |

[1] Impregnated with 5% of a cured urea-formaldehyde resin and 25% of butadiene-styrene resin based on the dry weight of the felt sheet.
[2] Impregnated with 9% of a polyvinyl acetate resin and 30% petroleum resin based on the dry weight of the felt sheet.

The resinous composition of the wear layer overlying the pigmented design can be selected from a variety of plasticized resinous compositions. The wear layer can be applied on a coating or by laminating a film of wear layer composition to the base. Vinyl resinous compositions have been found to be particularly suitable for the purposes of the invention. Such vinyl resinous materials include homopolymers, such as polyvinyl chloride, polyvinyl acetate, polyvinyl propionate, polyvinyl butyrate, polymerized vinylidene chloride, polymerized acrylic acid, polymerized ethyl acrylate, polymerized methyl acrylate, polymerized propyl acrylate, polymerized butyl acrylate, and the like; polymers formed by reaction of these monomers with each other such as vinyl chloride copolymer, methyl methacrylate-vinyl chloride copolymer, methyl acrylate-ethyl acrylate copolymer, ethyl acrylate-butyl acrylate copolymer, and the like and copolymers of the above with other monomers copolymerizable therewith, such as vinyl esters including vinyl bromide, vinyl chloroacetate, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, chlorostyrene, coumarone, vinyl pyridine and the like. Other resins suitable for use in the invention include maleic and fumaric acid and their derivatives such as diethyl maleate, dibutyl maleate, dimethyl fumarate and the like; unsaturated hydrocarbon such as ethylene, propylene, butylene and the like; allyl compounds such as allyl acetate, allyl chloride, allyl ethyl ether, and the like; conjugated and cross-conjugated unsaturated compounds such as butadiene, isoprene, chloroprene, 2,3-dimethylbutadiene-1,3, divinyl ketone and the like. The monomers listed hereinabove are useful in preparing copolymers with a vinyl resin and can be used as modifiers in the polymerization, in which case they can be present in an amount of a few percent, or they can be used in larger quantities. This invention is applicable to any resinous composition material which is compatible with a plasticizer. Besides the vinyl resinous materials mentioned previously, linoleum compositions can be used. Linoleum is conventionally prepared from a mixture of oxidized and polymerized drying or semi-drying oil, resin, filler and pigment. The oil and the resin function as a binder or cement for the filler and pigment and generally comprise from about 20 percent to about 50 percent of the composition. The remainder consists essentially of filler such as ground cork, calcium carbonate, wood flour, talc, and the like and pigments. The siccative oil can be linseed, tall, esterified tall, perilla, rubberseed, and the like. The resin can be rosin, ester gums, fused congo, congo ester, kauri gum, and the like. In addition, rubber compositions of synthetic or natural compositions, and natural resinous compositions can also be used as the wear layer composition.

The plasticizer employed in this invention must be one in which the pigments of the design are soluble in order that bleeding will occur through the wear layer. Esters of straight and branched chain aliphatic alcohols with aliphatic acids are suitable for use in this invention. The preferred esters of this type are diesters containing from about 8 to about 34 carbon atoms. Typical plasticizers of this type include dibutyl sebacate, dioctyl azelate, triethylene glycol di(2-ethyl hexanoate), diethylene glycol dipelargonate, triethylene glycol dicaprylate, and the like. Also suitable are those plasticizers of the aromatic type such as esters of aliphatic alcohols and aromatic acids or aromatic alcohols and aliphatic acids or aromatic alcohols and aromatic acids. The preferred esters of this type are diesters containing from about 8 to about 34 carbon atoms. Typical plasticizers of this type include dibutyl phthalate, dicapryl phthalate, dioctyl phthalate, dibutoxy ethyl phthalate, dipropylene glycol dibenzoate, butyl benzyl sebacate, butyl benzyl phthalate, dibenzyl sebacate, dibenzyl phthalate, and the like. Other types of plasticizers such as esters of inorganic acids including tricresyl phosphate, tributyl phosphate, phenyl phosphate, octyl diphenyl phosphate, and the like, alkyd derivatives of rosin, chlorinated paraffin, high molecular weight hydrocarbon condensates, epoxidized drying oils and the like can also be used. Normally, about 20 to about 150 parts of plasticizer per 100 parts of resin are used to formulate the wear layer composition in this invention. The use of about 30 to about 70 parts of plasticizer per 100 parts resin is particularly effective.

Minor amounts of stabilizers which are incorporated to reduce the effects of degradation by light and heat can also be present in the composition. Suitable light stabilizers include resorcinol disalicylate, resorcinol dibenzoate, phenyl phthalate, phenyl benzoate, ortho tolyl benzoate, eugenol, guaiacol, ortho nitrophenol, ortho nitraniline, triethylene glycol salicylate, and organic phosphates and other complexes of such metals as barium, cadmium, tin, lead, strontium, and the like. Suitable heat stabilizers include sulfides and sulfites of aluminum, silver, calcium, cadmium, magnesium, cerium, sodium, strontium, and the like; glycerine, leucine, alanine, ortho and para amino benzoic and sulfanilic acids, hexamethylene tetramine, weak acid radicals including oleates, recinoleates, abietates, salicylates, and the like. Normally, the compositions contain from about 0.5 to about 5 parts stabilizer per 100 parts resin.

As indicated above, a foamable plastisol composition can be used by adding an effective amount of a blowing agent to a plastisol formed of resin and plasticizer. The larger the amount of blowing agents within practical limits used, the greater is the expansion of the foam. Foam densities of from 10 percent to 50 percent of the density of the unblown plastisol can be readily attained. Such results are attainable with from about 1 to about 20 parts foaming agent per 100 parts resin with from about 2 to about 10 parts of foaming agent per 100 parts resin being particularly effective for the production of foams of a density which are most desirable for use in producing surface coverings in accordance with the invention. Complex organic compounds which when heated decompose to yield an inert gas and have residues which are compatible with the resin used in the plastisol are preferred as blowing agents. Compounds having the $>$N—N$<$ and —N$=$N— linkages decompose at elevated temperatures to yield an inert gas high in nitrogen. Typical compounds include substituted nitroso compounds, substituted hydrazides, substituted azo compounds and the like. Inorganic carbonates and bicarbonates, such as sodium bicarbonate, and ammonium carbonate decompose in the presence of acid to liberate carbon dioxide and inorganic nitrogen containing compounds, such as sodium nitrite and ammonium nitrite which decompose to liberate nitrogen can also be employed as blowing agents.

As indicated above, a clear surface coat can be applied over the wear layer film in order to improve the soil resistance of the product. In addition, such a coating can be used to safeguard against surface exudation of the pigment of the design. The clear coat should be resistant to plasticizer migration in order that the pigment of the design will not move through the coat. The clear coat must also be compatible with the wear layer in order to adhere sufficiently to the layer. Acrylic resins have proved particularly effective in providing a surface coat that is resistant to plasticizer bleeding. Among the resins that can be employed in such surface coats are homopolymers such as plasticized methyl acrylate, polymerized ethyl acrylate, polymerized methyl methacrylate, and the like, and copolymers of the above with each other such as methyl acrylate-methyl methacrylate copolymer, methyl acrylate-ethyl acrylate copolymer, ethyl acrylate-butyl-acrylate copolymer, and the like.

The following examples are given for the purpose of illustration:

Example I

A pigment composition is prepared by mixing the following composition:

| | Parts |
|---|---|
| A copolymer of vinyl chloride (87%) and vinyl acetate (13%) (30% resin in methyl ethyl ketone) | 100 |
| Benzidine Yellow | 10 |
| Dioctyl phthalate | 15 |

The Benzidine Yellow is ground into the dioctyl phthalate to form a smooth paste which is then added to the copolymer solution. The mixture is diluted to the desired viscosity by the addition of methyl ethyl ketone.

Example II

A pigment composition is prepared having the following formulation:

| | Parts |
|---|---|
| Hansa Yellow G (40% aqueous dispersion) | 100 |
| Polyvinyl acetate polymer latex (55% solids) | 50 |

The mixture was diluted with water to obtain the desired printing viscosity.

Example III

A pigment composition is prepared having the following formulation:

| | Parts |
|---|---|
| Toluidine Red (30% aqueous dispersion) | 25 |
| Aqueous dispersion of polyvinyl chloride polymer internally plasticized (30% solids) | 100 |

The composition is diluted with water to the desired printing viscosity.

Example IV

A pigment composition is prepared having the following formulation:

| | Parts |
|---|---|
| PTA Green Toner | 15 |
| Copolymer of polyvinyl chloride (87%) and polyvinyl acetate (13%) in methyl ethyl ketone (30% solids) | 100 |
| Dioctyl phthalate | 22.5 |

The PTA Green Toner is ground into the dioctyl phthalate to form a smooth paste which is then added to the copolymer solution. The mixture is diluted to the desired printing viscosity by the addition of methyl ethyl ketone.

Example V

A pigment composition is prepared having the following formulation:

| | Parts |
|---|---|
| Violet Toner PTMA | 10 |
| Copolymer of polyvinyl chloride (87%) and polyvinyl acetate (13%) in methyl ethyl ketone (20% solids) | 100 |
| Dioctyl phthalate | 15 |

The PTMA Violet Toner is ground into the dioctyl phthalate to form a smooth paste which is then added to the copolymer solution. The mixture is diluted to the desired viscosity by the addition of methyl ethyl ketone.

Example VI

A pigment composition is prepared having the following formulation:

| | Parts |
|---|---|
| Naphthol Red | 45 |
| Copolymer of polyvinyl chloride (87%) and polyvinyl acetate (13%) in methyl ethyl ketone (30% solids) | 100 |

The mixture was ground in a pebble mill to produce a smooth composition and then diluted with methyl ethyl ketone to the desired printing viscosity.

Example VII

A pigment composition is prepared having the following formulation:

| | Parts |
|---|---|
| Blue Toner PTA | 30 |
| Copolymer of polyvinyl chloride (87%) and polyvinyl acetate (13%) in methyl ethyl ketone (30% solids) | 100 |

The mixture was ground in a pebble mill to produce a smooth composition and then diluted with methyl ethyl ketone to the desired printing viscosity.

Example VIII

A cellulosic film felt sheet of 0.043 inch in thickness impregnated with about 30 percent of a hydrocarbon resin and 9 percent of a polyvinyl acetate is thereafter coated with an aqueous paint having the following composition which serves as a seal coat for preventing bleeding of the felt impregnant and to aid adhesion of the coatings to the felt:

| | Parts |
|---|---|
| Vinyl chloride-vinyl acetate copolymer latex (56% solids) | 18 |
| Butadiene-styrene copolymer latex (45% solids) | 20 |
| Titanium dioxide and limestone (65% solids) | 123 |

The pigment formulation described in Example VII is diluted with methyl ethyl ketone to obtain the desired ink viscosity and applied in the form of a design to the coated felt. Over this design, after drying to remove the solvent, is applied an 0.006 inch thick layer of a white polyvinyl chloride plastisol of the following composition:

| | Parts |
|---|---|
| Polyvinyl chloride (dispersion grade) | 100 |
| Dioctyl phthalate | 54 |
| Dibasic lead phosphite (58% in dioctyl phthalate) | 5.2 |
| Titanium dioxide (58% in dioctyl phthalate) | 8.6 |

The plastisol is then heated at 400° F. for two minutes to cause the pigment to bleed through the vinyl resinous layer and fuse the composition, reproducing the printed design with good color and fidelity. A clear wear resistant coating is prepared using the following composition:

| | | |
|---|---|---|
| Acryloid B-44* (40% in toluol) | parts | 100 |
| Toluol | do | 80 |
| Solids | percent | 22.2 |

*An acrylic resin manufactured by Rohm & Haas Co., Philadelphia, Pennsylvania.

The clear wear resistant coating was diluted to spray viscosity with methyl ethyl ketone and applied to the vinyl resinous layer in a layer about 0.001 inch thick. The top coating was then air dried and the resulting wear layer was impervious to any plasticizer bleeding.

Example IX

The pigment formulation according to Example II is applied to an asbestos sheet of about 0.043 inch in thickness impregnated with about 20 percent of neoprene rubber. Prior to printing, the felt sheet is coated with a thin coating having the following composition:

| | Parts |
|---|---|
| Polyvinyl chloride latex (preplasticized 54% solids) | 42 |
| Titanium dioxide (60% solids) | 15 |
| Calcium carbonate dispersion (60% solids) | 43 |

Over the design, after drying, is applied an 0.006 inch thick layer of a foamable plastisol composition of the following composition:

| | Parts |
|---|---|
| Polyvinyl chloride (dispersion grade) | 100 |
| Petroleum hydrocarbon condensate* | 18 |
| Butyl benzyl phthalate | 52 |
| Finely divided filler | 3 |
| Stabilizer | 4 |
| Azodiformamide blowing agent | 3.5 |

*Conoco 300—Continental Oil Co., Ponca City, Okla.

The coated sheet is then passed through an oven maintained at 400° F. with a residence time of three minutes, thereby fusing the resin and foaming the composition. On completion of the heating step, the pigment of the design has bled through the foamed layer, reproducing color and design throughout the foam layer with good fidelity.

Example X

A conventional linoleum composition was formed containing 37.9 percent binder which consisted of blown and polymerized linseed oil, about 25 percent rosin, 27.5 percent wood flour, 25.7 percent calcium carbonate, and 9.6 percent inorganic pigments, and calendered to form a sheet about 0.030 inch in thickness. The pigment formulation according to Example III was applied to a felt sheet such as utilized in Example VIII in the form of a design. The calendered linoleum sheet was then laminated over the dried design on the base sheet and the sheet was cured by subjecting to a temperature of about 180° F. for a period of about three weeks. At the completion of the curing period, the pigment design had bled through the linoleum layer, reproducing color and design with good fidelity.

Any departure from the above description which conforms to the present invention is intended to be included within the scope of the claims.

What is claimed is:

1. A process of producing a resinous composition surface covering having a geometric decoration which comprises applying a composition containing a bleeding pigment in the form of a design on the surface of a backing sheet, covering said design-covered backing sheet with a uniform layer of a resinous composition containing a plasticizer which is a solvent for said pigment at elevated temperature, heating the layer to cause said pigment to migrate upward through said layer thereby reproducing said design throughout the thickness of said layer, discontinuing said heating when said pigment is visible in the upper surface of said layer and cooling said resinous composition layer containing said plasticizer and pigment.

2. The process of claim 1 wherein said layer has a thickness of about 0.005 to about 0.015 inch.

3. The method of claim 1 wherein said resinous composition is a vinyl resinous composition.

4. The process of claim 3 wherein said layer is subjected to said heating for a period of about ½ to about 4 minutes at a temperature of about 300° F. to about 400° F.

5. The method according to claim 3 wherein said vinyl resinous composition is a vinyl chloride resinous composition.

6. The process of claim 3 wherein said resinous layer contains a blowing agent and said heating also causes the decomposition of said blowing agent to convert said layer to a foam structure having a thickness of about 0.010 to about 0.100 inch.

7. The process of claim 3 wherein said plasticizer is a polyester containing from about 8 to about 34 carbon atoms.

References Cited by the Examiner
UNITED STATES PATENTS

| | | |
|---|---|---|
| 2,629,956 | 3/1953 | Switzer _____ 117—15 |
| 2,961,332 | 11/1960 | Nairn. |
| 3,076,234 | 2/1963 | Paulus _____ 156—166 |
| 3,109,746 | 11/1963 | Seedorf _____ 117—15 |

EARL M. BERGERT, *Primary Examiner.*

R. I. SMITH, M. L. KATZ, *Assistant Examiners.*